United States Patent [19]

Weder

[11] 4,297,811
[45] Nov. 3, 1981

[54] LAMINATED PRINTED FOIL FLOWER POT WRAP WITH MULTICOLOR APPEARANCE

[75] Inventor: Donald E. Weder, Highland, Ill.

[73] Assignee: Seven W Enterprises, Inc., Highland, Ill.

[21] Appl. No.: 151,421

[22] Filed: May 19, 1980

[51] Int. Cl.³ .................. B32B 3/10; B32B 3/28; B32B 15/08
[52] U.S. Cl. .................. 47/72; 206/423; 229/3.5 MF; 229/87 P; 428/172; 428/174; 427/195; 428/209; 428/213; 428/461; 428/913
[58] Field of Search .............. 428/172, 204, 209, 207, 428/212, 213, 214, 461, 187, 195, 913, 174; 206/423; 47/41 R, 72; 150/52 R; 229/87 P, 3.5 MF

[56] References Cited

U.S. PATENT DOCUMENTS 2,355,559 8/1944 Renner .................. 229/3.5 MF
4,216,620 8/1980 Weder et al. .................. 206/423

Primary Examiner—Paul J. Thibodeau
Attorney, Agent, or Firm—Harvey B. Jacobson

[57] ABSTRACT

A sheet of material having a single color of ink or other printing medium applied thereto to produce a multicolor appearance. In the disclosed embodiment, the sheet material is a metallic foil, such as alluminum foil of thin flexible construction, used as a flower pot wrap with the foil being laminated to a thin plastic film or sheet of polypropylene or the like. The printing technique which produces a multicolor appearance uses a conventional printing apparatus with one print station being employed with the multicolor effect resulting from different thicknesses of ink of the same color being laid onto the substrate surface thereby providing a color applied in varying intensities to produce a multicolor effect or appearance when using a single color ink at a single print station as compared with conventional techniques of printing several colors onto sheet material with the printing press including individual printing stations for each color required with each printing station being provided with ink of the color desired with the colors being individually matched to the color standard required and each print station being kept in register by adjustments on the printing press and each printing station requiring an individually made and mounted print cylinder or other printing device. With this technique, the multicolor appearance produced by using a single color at a single printing station materially reduces the cost and time involved in producing the multicolor appearance on the sheet material.

4 Claims, 2 Drawing Figures

LAMINATED PRINTED FOIL FLOWER POT WRAP WITH MULTICOLOR APPEARANCE

BACKGROUND OF THE INVENTION

1. Field of the Invention

The present invention generally relates to the printing of a sheet of material with a single color ink in a manner to produce a multicolor appearance and more particularly, the printing of metallic foil in this manner for use as a decorative wrap for flower pots, and the like, with the foil being laminated to a plastic sheet or film, such as polypropylene or the like.

2. Description of the Prior Art

When printing paper or other sheet material or webs to produce a multicolor appearance, it is conventional to utilize a printing press with individual printing stations for each color required. Each printing station on the press is filled with ink of the color desired and each color of ink must be individually matched to the color standard desired. Additionally, each printing station on the press must be kept in register by careful adjustments on the press and each printing station requires a separate and individually made and mounted print cylinder, drum, plate, or the like. This conventional technique has been used extensively with various types of printing devices and materials. It is also known to print on metallic foil, such as aluminum foil, with certain areas of the foil being left uncoated so that the foil or substrate is visible. This technique has been employed in making various types of decorative paper and foil wrapping material. Also, metallic foil printed with a single color for use as decorative wrapping, including wrapping for flower pots, and the like, has been used.

SUMMARY OF THE INVENTION

An object of the present invention is to provide a sheet of material, such as a thin, flexible metallic foil, paper, film or other web printed with a single color with certain areas of the color applied to the substrate varying in thickness and thus varying in intensity thereby providing a multicolor appearance to the finished product with the sheet of material also being laminated to a thin flexible film of plastic material, such as polypropylene, which facilitates use of the sheet of material as a flower pot wrap and enhances the strength characteristics of the sheet of material especially where it is to be bent, folded, wrapped around corners or sharp edges, and the like.

Another object of the invention is to provide a laminated printed foil flower pot wrap having a multicolor appearance resulting from a single printing operation with a single color in which the colored printing medium is applied to the foil in varying thicknesses thus resulting in varying intensity of the single color to produce a multicolor effect or appearance.

Still another object of the invention is to provide a foil in accordance with the preceding objects in which certain areas of the printed foil are left uncoated with these areas delineating the areas of differing color intensities thereby enhancing the multicolor appearance by spatially separating areas of one intensity of the single color from areas of another intensity of the single color to render more observable the differences in the intensity of the single color in different areas of the foil.

Yet another object of the invention is to provide a foil in accordance with the preceding objects which is quite inexpensive to manufacture, utilizes conventional printing apparatuses and produces a unique and attractive appearance to the foil.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
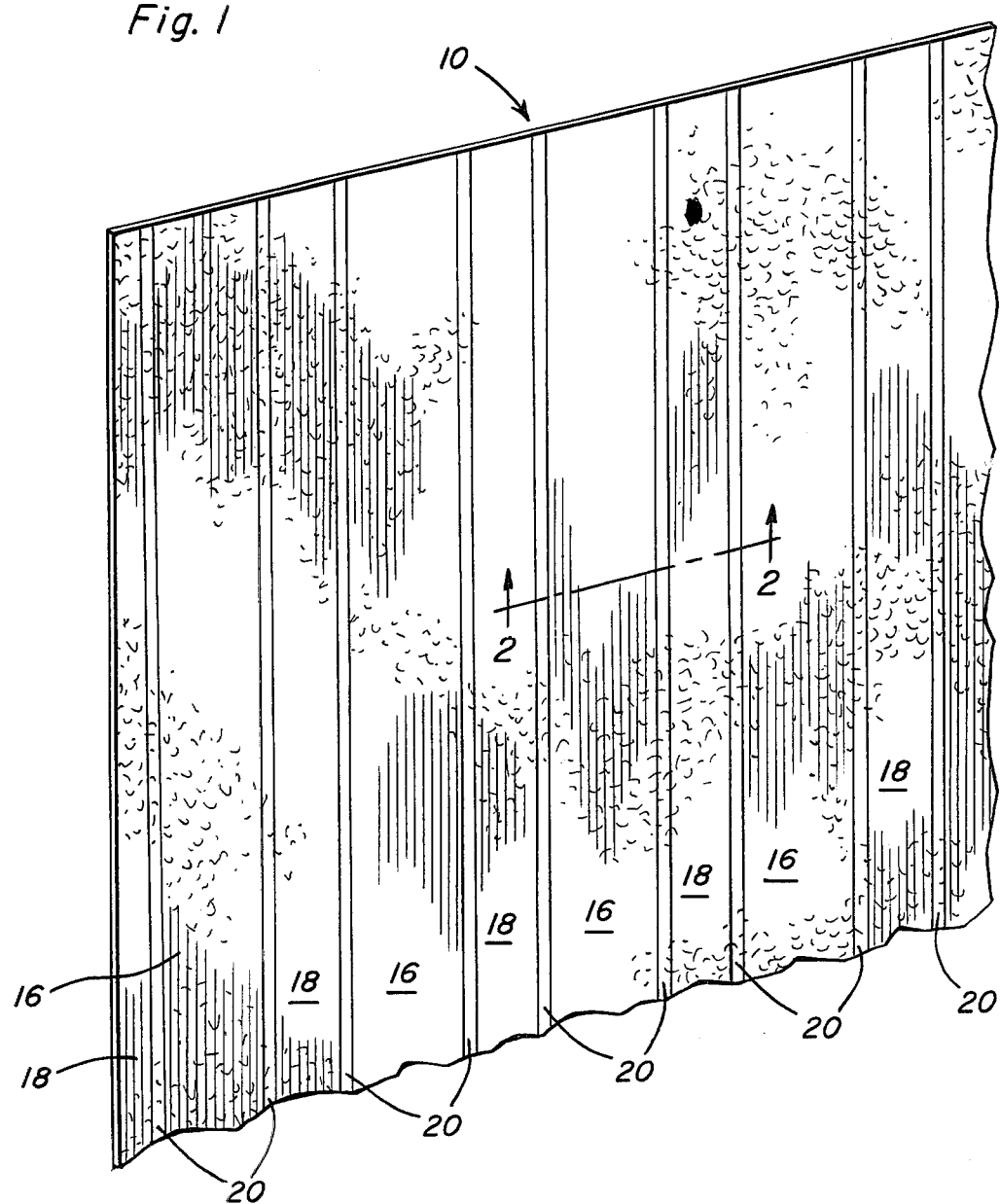
FIG. 1 is a perspective view of a segment of foil in accordance with the present invention.
Figure 2:
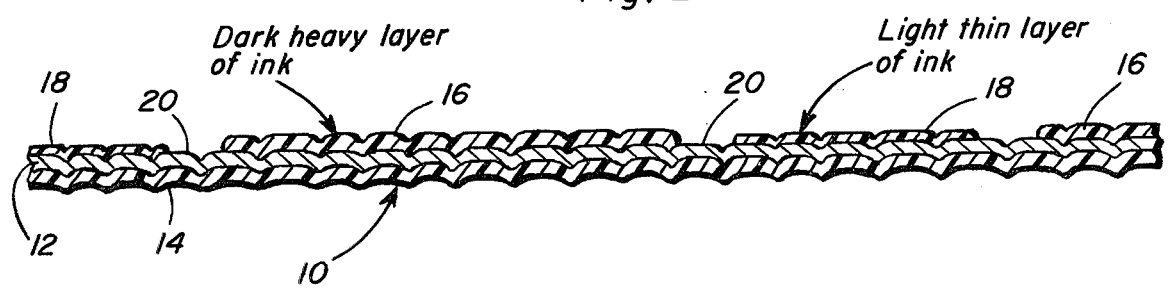
FIG. 2 is a fragmental sectional view, on an enlarged scale, illustrating the association of the foil substrate, the plastic film laminated thereto, the different thicknesses and intensities of the single color of ink and the uncoated portions of the foil separating the areas of varying intensity of the single color.

Referring now specifically to the drawings, the laminated printed foil flower wrap of the present invention is generally designated by numeral 10 and may be of any desired dimensional characteristics or constructed as a web of material rolled onto a supply roll, or the like, so that it may be easily dispensed for use in flower shops, and the like. The foil wrap 10 is of flexible construction and relatively thin to enable it to be easily shaped around the outside of a flower pot, or the like, and the construction of the wrap 10 is such that it will be shape sustaining whereby positioning of the foil wrap around a flower pot and deforming it so that it snugly embraces the flower pot will retain the wrap in position thereon. If desired, fastening arrangements may be provided, such as adhesive or other fastening procedures especially if the wrap is to be used for purposes other than covering flower pots.

The wrap 10 is of laminated construction and includes a continuous imperforate layer 12 of metallic foil 12 such as aluminum foil having the thickness usually employed as a wrapping material, so that it is easily flexible but yet will, to some degree, retain its own shape after being deformed. On one surface of the foil 12, there is a continuous layer 14 of plastic material such as polypropylene bonded thereto in a manner well-known in the art. The plastic film or layer 14 serves to reinforce the wrap 10 and prevent the foil from tearing when folded around corners, sharp edges, or the like, and also increases the body and manipulative characteristics of the wrap.

The other surface of the foil layer 12 is printed with ink of a single color by use of an engraved printing plate, printing drum, or any other printing apparatus with the single color printing ink being applied in certain areas with a heavy layer designated by numeral 16 and in other areas in a thinner layer designated by numeral 18 with portions of the foil layer 12 being uncoated as indicated by numeral 20. As illustrated, the uncoated areas 20 are in the form of parallel, relatively narrow stripes, whereas the layers 16 and 18 of ink are relatively wider. In one arrangement, as illustrated, the thick layer of ink is wider than the thin layer of ink and are also in the form of stripes as illustrated in FIG. 1 thus providing a striped effect on the wrap with alternating narrow and wide stripes of a single color with the wide stripes being a dark color and the narrow stripes being a lighter tone of the same color due to the reduction in intensity resulting from the thinner characteristics of the layer of the same color ink. The uncoated stripes 20 are relatively narrow and separate the dark colored stripes or layers 16 from the light colored stripes or layers 18, thus enhancing the striped effect of the wrap 10 and enhancing the capability of the lighter color being discernible and readily observable as compared with the darker color.

Also as illustrated, the wrap 10 is provided with multiple indentations 22 which produce a graining effect or metallic flake effect since the layers of colored ink follow the indentations 22 and thus produce light reflective characteristics which are different in the areas of the indentations as compared to the other areas of the layers of ink, with the indentations also being provided in the uncoated areas 20.

The uncoated stripes 20 are quite narrow as compared to the width of the light colored layer 18 and the dark colored layer 16 and the light colord layer 18 is of less width than the dark colored layer 16. The variation in the intensity of the color caused by the difference in thickness between the dark layer of the color and the light layer of the color combined with the uncoated stripe therebetween produces a multicolor effect, that is the color is the same but the color is quite dark and intense in the areas 16 whereas the same color is lighter and less intense in the areas 18. For example, if the heavy layer of colored ink is red, it will be a deep or relatively dark red, whereas the lighter coating of red ink in the areas 18 will be a lighter red or pinkish color. This produces a multicolor or multitone effect of a single color with the uncoated stripes serving to effectively delineate the different colored area. While the stripes and coated areas have been illustrated as being striped with the stripes being parallel, it is pointed out that the stripes may be angled or curved and the areas need not necessarily be stripes with parallel edges. In addition, while aluminum florist foil and polypropylene plastic film have been disclosed for use as a flower pot wrap, it is pointed out that the present invention may also be used in conjunction with other types of films or substrates, such as paper and other plastics, with the ink or coloring medium used being selected for use with the specific substrate being used. The lamination of the foil layer 12 and the plastic film 14 strengthens the final product and the indentations combined with the dark heavy layer of ink and the light thin layer of ink of the same color and the uncoated areas 20 combined to produce a uniquely attractive wrapping material, especially useful for wrapping flower pots of different sizes and for other uses in a flower shop and for wrapping various items such as gifts, Christmas packages, and the like, in a decorative manner and for other uses in which a decorative multicolor effect is desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A decorative wrapping material or the like in the form of a flexible panel member having a multicolor appearance comprising a surface on said member, a relatively thick layer of colored ink on certain areas of the surface and relatively thin layer of colored ink, of the same color as the thicker layer on other areas of the surface thereby providing a single color having areas of varying intensity thereby producing a multicolor effect on the surface, and a thin layer of plastic material laminated to the flexible panel member on the surface opposite from the colored layer, said flexible panel member being a flexible metallic foil, the relatively thick areas and the relatively thin areas of colored ink being delineated from each other by an uncoated area of the metallic foil enabling it to be observed and enhancing the variation in color intensity between adjacent areas.

2. The member as defined in claim 1 wherein said metallic foil is in the form of a reflective foil with the uncoated areas being reflective, said foil being provided with indentations to vary the reflective characteristics in the uncoated areas and coated areas to further enhance the multicolor appearance.

3. The member as defined in claim 2 wherein said coated areas and uncoated areas are in the form of stripes with the uncoated areas being substantially narrower than the coated areas.

4. The member as defined in claim 3 wherein the foil is in the form of a sheet having predetermined dimensions for positioning around a flower pot to form a wrapping for the flower pot and enhance the appearance characteristics thereof with the foil being self-sustaining when deformed around the flower pot.

* * * * *